United States Patent
Oguro et al.

(10) Patent No.: US 9,681,076 B2
(45) Date of Patent: Jun. 13, 2017

(54) SOLID-STATE IMAGING DEVICE AND METHOD OF DRIVING SOLID-STATE IMAGING DEVICE

(71) Applicant: CANON KABUSHIKI KAISHA, Tokyo (JP)

(72) Inventors: Yasuhiro Oguro, Tokyo (JP); Kazuo Yamazaki, Yokohama (JP); Seiichirou Sakai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/056,527

(22) Filed: Feb. 29, 2016

(65) Prior Publication Data

US 2016/0277695 A1  Sep. 22, 2016

(30) Foreign Application Priority Data

Mar. 17, 2015 (JP) ................................. 2015-053097

(51) Int. Cl.
| | |
|---|---|
| *H04N 5/335* | (2011.01) |
| *H04N 5/369* | (2011.01) |
| *H04N 5/357* | (2011.01) |
| *H04N 5/378* | (2011.01) |
| *H04N 5/374* | (2011.01) |

(52) U.S. Cl.
CPC ........... *H04N 5/3698* (2013.01); *H04N 5/357* (2013.01); *H04N 5/374* (2013.01); *H04N 5/378* (2013.01)

(58) Field of Classification Search
None
See application file for complete search history.

(56) References Cited

U.S. PATENT DOCUMENTS

| 4,663,669 A | 5/1987 | Kinoshita et al. |
|---|---|---|
| 4,821,105 A | 4/1989 | Suga et al. |
| 7,423,790 B2 | 9/2008 | Kochi et al. |
| 7,460,164 B2 | 12/2008 | Hyama et al. |
| 7,629,568 B2 | 12/2009 | Koizumi et al. |
| 7,816,755 B2 | 10/2010 | Yamazaki et al. |
| 8,049,799 B2 | 11/2011 | Sonoda et al. |
| 8,106,343 B2 | 1/2012 | Arishima et al. |
| 8,325,260 B2 | 12/2012 | Yamazaki et al. |

(Continued)

FOREIGN PATENT DOCUMENTS

JP  2005-217771 A  8/2005

*Primary Examiner* — Roberto Velez
*Assistant Examiner* — Stephen Coleman
(74) *Attorney, Agent, or Firm* — Fitzpatrick, Cella, Harper & Scinto

(57) ABSTRACT

A solid-state imaging device includes a pixel including a photoelectric conversion element, an accumulation unit accumulating charges generated by the photoelectric conversion element, a reset unit resetting the accumulation unit at a voltage of equal to or more than 4.05 V, and an amplifier transistor amplifying and outputting a signal corresponding to amount of accumulated charges, a vertical output line connected to the pixel, a current source circuit including first to third transistors flowing a constant current through the vertical output line, and a voltage setting circuit respectively setting the gate voltages of the first to third transistors to a first voltage, a second voltage higher than the first voltage, and a third voltage higher than the second voltage and lower than the power supply voltage so as to set the drain-source voltage of each of the first to third transistors to equal to or less than 1.75 V.

20 Claims, 5 Drawing Sheets

(56) References Cited

U.S. PATENT DOCUMENTS

| | | |
|---|---|---|
| 8,582,003 B2 | 11/2013 | Sakai |
| 8,760,337 B2 | 6/2014 | Yamazaki |
| 8,836,313 B2 | 9/2014 | Takagi et al. |
| 8,872,092 B2 | 10/2014 | Ryoki et al. |
| 9,060,139 B2 | 6/2015 | Yamazaki |
| 9,093,351 B2 | 7/2015 | Sakai et al. |
| 9,288,415 B2 | 3/2016 | Yamazaki et al. |
| 2015/0215561 A1 | 7/2015 | Maehashi et al. |
| 2015/0281615 A1 | 10/2015 | Kobayashi et al. |
| 2015/0341580 A1 | 11/2015 | Yamazaki et al. |
| 2016/0006968 A1 | 1/2016 | Sakai et al. |

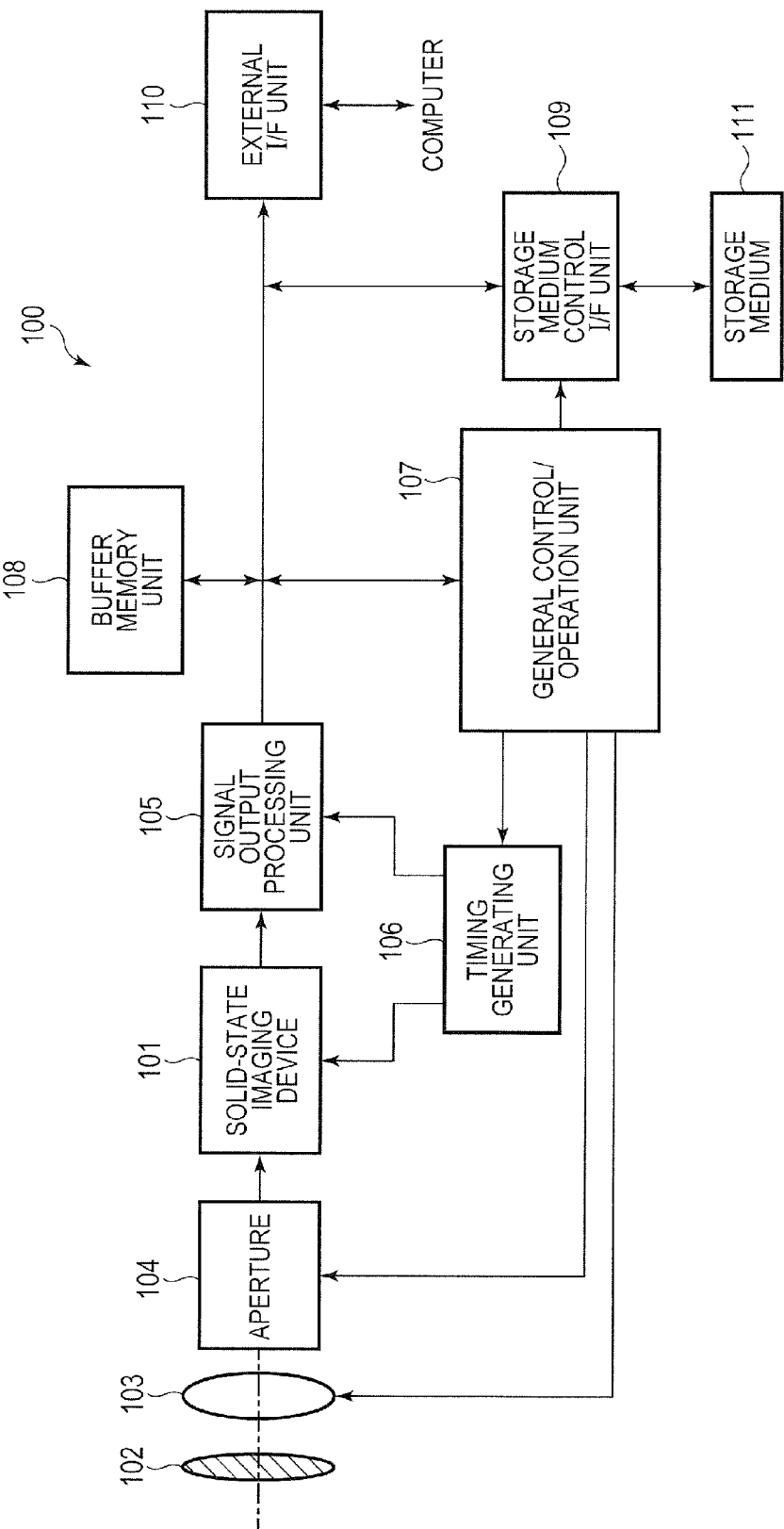

SOLID-STATE IMAGING DEVICE AND METHOD OF DRIVING SOLID-STATE IMAGING DEVICE

BACKGROUND OF THE INVENTION

Field of the Invention

The present invention relates to a solid-state imaging device and a method of driving the solid-state imaging device.

Description of the Related Art

Japanese Patent Application Laid-Open No. 2005-217771 discloses a technique of reducing heat generation, hot carrier generation, and light emission by recombination of hot carriers which are caused by the operation of an operational amplifier, which amplifies and outputs pixel signals, by activating the operational amplifier only for a necessary period and inactivating it for other periods.

However, Japanese Patent Application Laid-Open No. 2005-217771 has proposed countermeasures against hot carrier light emission at the time of inactivation of the operational amplifier but has not proposed any countermeasures against hot carrier light emission at the time of activation of the operational amplifier. In addition, in general, since a high voltage is applied between the source and drain of a transistor forming a current source serving as part of the source-follower circuit of a pixel, hot carriers generated by electric field concentration flow into a photoelectric conversion element to become noise components. This sometimes has degraded image quality. In addition, light emission by hot carrier recombination has sometimes been a cause of noise.

SUMMARY OF THE INVENTION

An object of the present invention is to provide a solid-state imaging device which can suppress image quality degradation caused by hot carriers and a method of driving the solid-state imaging device.

According to one aspect of the present invention, there is provided a solid-state imaging device including a pixel including a photoelectric conversion element, an accumulation unit to which charges generated by the photoelectric conversion element are transferred, a reset unit configured to reset the accumulation unit at a power supply voltage of equal to or more than 4.05 V, and an amplifier transistor configured to amplify and output a signal corresponding to amount of charges accumulated in the accumulation unit, a vertical output line which is connected to the pixel and to which the signal amplified by the amplifier transistor is output, a current source circuit including a third transistor connected to the vertical output line, a second transistor connected in series with the third transistor, and a first transistor connected in series with the second transistor and configured to make a predetermined constant current flow through the vertical output line, and a voltage setting circuit configured to set a gate voltage of the first transistor to a first voltage, a gate voltage of the second transistor to a second voltage higher than the first voltage, and a gate voltage of the third transistor to a third voltage higher than the second voltage and lower than the power supply voltage so as to set a drain-source voltage of each of the first transistor, the second transistor, and the third transistor to equal to or less than 1.75 V.

According to another aspect of the present invention, there is provided a solid-state imaging device including a pixel including a photoelectric conversion element, an accumulation unit to which charges generated by the photoelectric conversion element are transferred, a reset unit configured to reset the accumulation unit at a power supply voltage, and an amplifier transistor configured to amplify and output a signal corresponding to amount of charges accumulated in the accumulation unit, a vertical output line which is connected to the pixel and to which the signal amplified by the amplifier transistor is output, a current source circuit including a third transistor connected to the vertical output line, a second transistor connected in series with the third transistor, and a first transistor connected in series with the second transistor and configured to make a predetermined constant current flow through the vertical output line, and a voltage setting circuit configured to set a gate voltage of the first transistor to a first voltage, a gate voltage of the second transistor to a second voltage higher than the first voltage, and a gate voltage of the third transistor to a third voltage higher than the second voltage and lower than the power supply voltage so as to prevent a drain-source voltage of each of the first transistor, the second transistor, and the third transistor from generating hot carriers.

According to still another aspect of the present invention, there is provided a method of driving method a solid-state imaging device including a pixel including a photoelectric conversion element, an accumulation unit to which charges generated by the photoelectric conversion element are transferred, a reset unit configured to reset the accumulation unit at a power supply voltage of equal to or more than 4.05 V, and an amplifier transistor configured to amplify and output a signal corresponding to amount of charges accumulated in the accumulation unit, a vertical output line to which the signal amplified by the amplifier transistor is output, and a current source circuit connected to the vertical output line, the current source circuit including a third transistor connected to the vertical output line, a second transistor connected in series with the third transistor, and a first transistor connected in series with the second transistor, the method comprising setting a gate voltage of the first transistor to a first voltage, a gate voltage of the second transistor to a second voltage higher than the first voltage, and a gate voltage of the third transistor to a third voltage higher than the second voltage and lower than the power supply voltage so as to set a drain-source voltage of each of the first transistor, the second transistor, and the third transistor to equal to or less than 1.75 V when reading out the signal from the pixel.

Further features of the present invention will become apparent from the following description of exemplary embodiments with reference to the attached drawings.

BRIEF DESCRIPTION OF THE DRAWINGS

FIG. 6 is a schematic view illustrating an example of the arrangement of an imaging system according to a fourth embodiment of the present invention.

DESCRIPTION OF THE EMBODIMENTS

Preferred embodiments of the present invention will now be described in detail in accordance with the accompanying drawings.

First Embodiment

Figure 1:
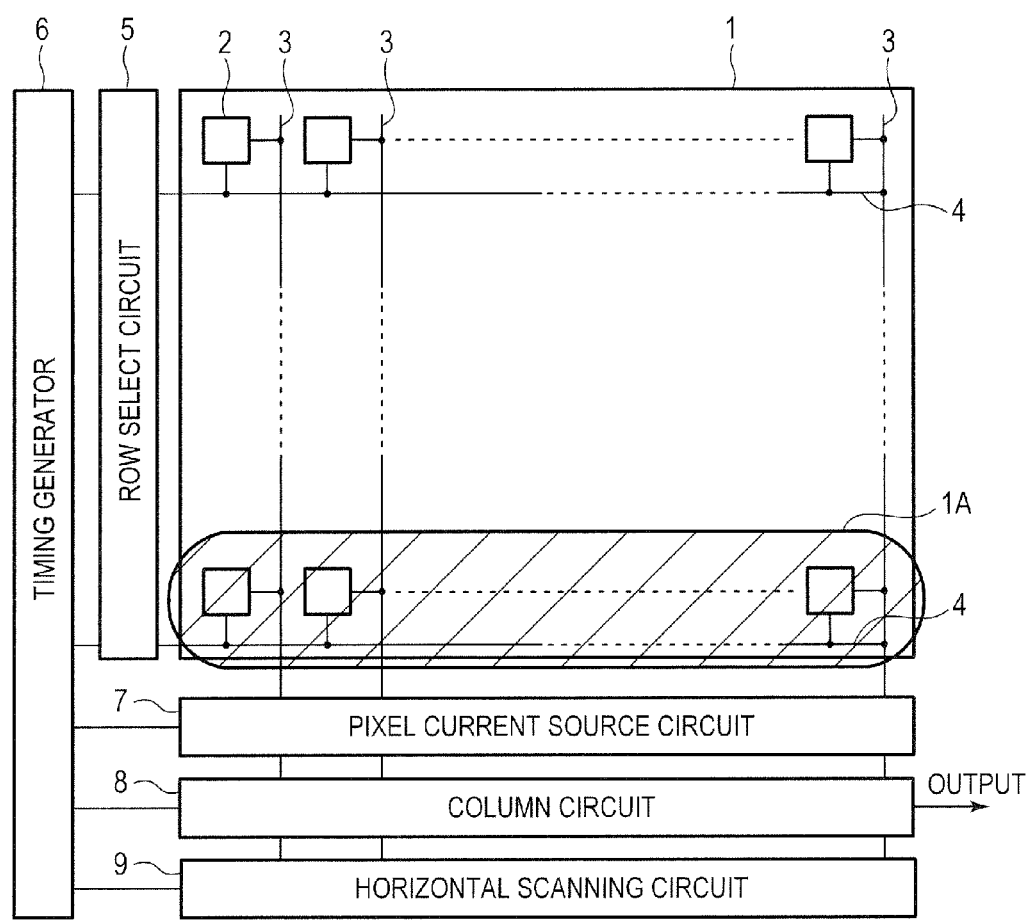
FIG. 1 is a schematic view illustrating the overall arrangement of a solid-state imaging device according to a first embodiment of the present invention.
Figure 2:
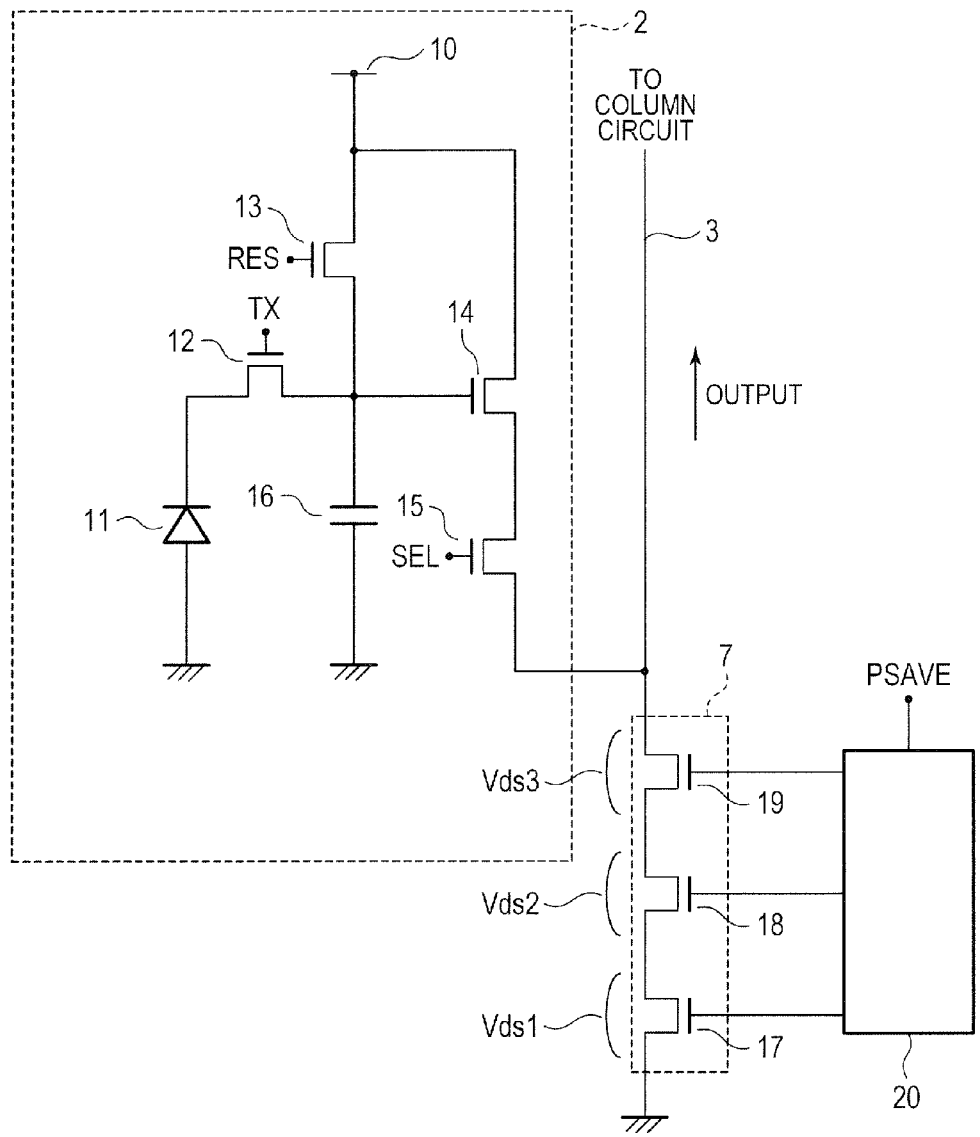
FIG. 2 is a circuit diagram illustrating the circuit arrangement of a pixel and a pixel current source circuit of the solid state imaging device according to the first embodiment of the present invention.
Figure 3:
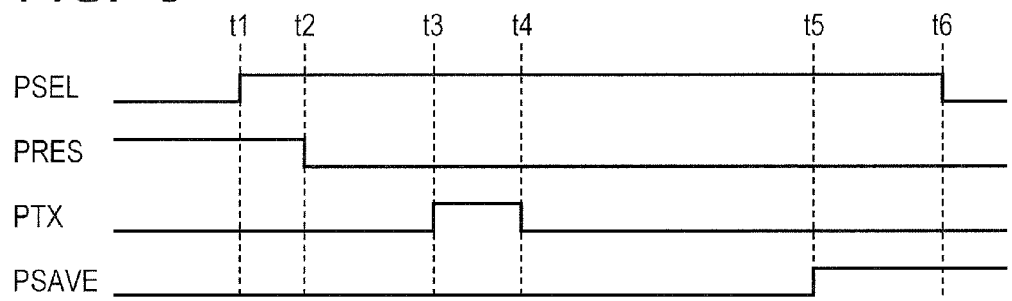
FIG. 3 is a timing chart illustrating the operation timing in a method of driving the solid-state imaging device according to the first embodiment of the present invention.
Figure 4:
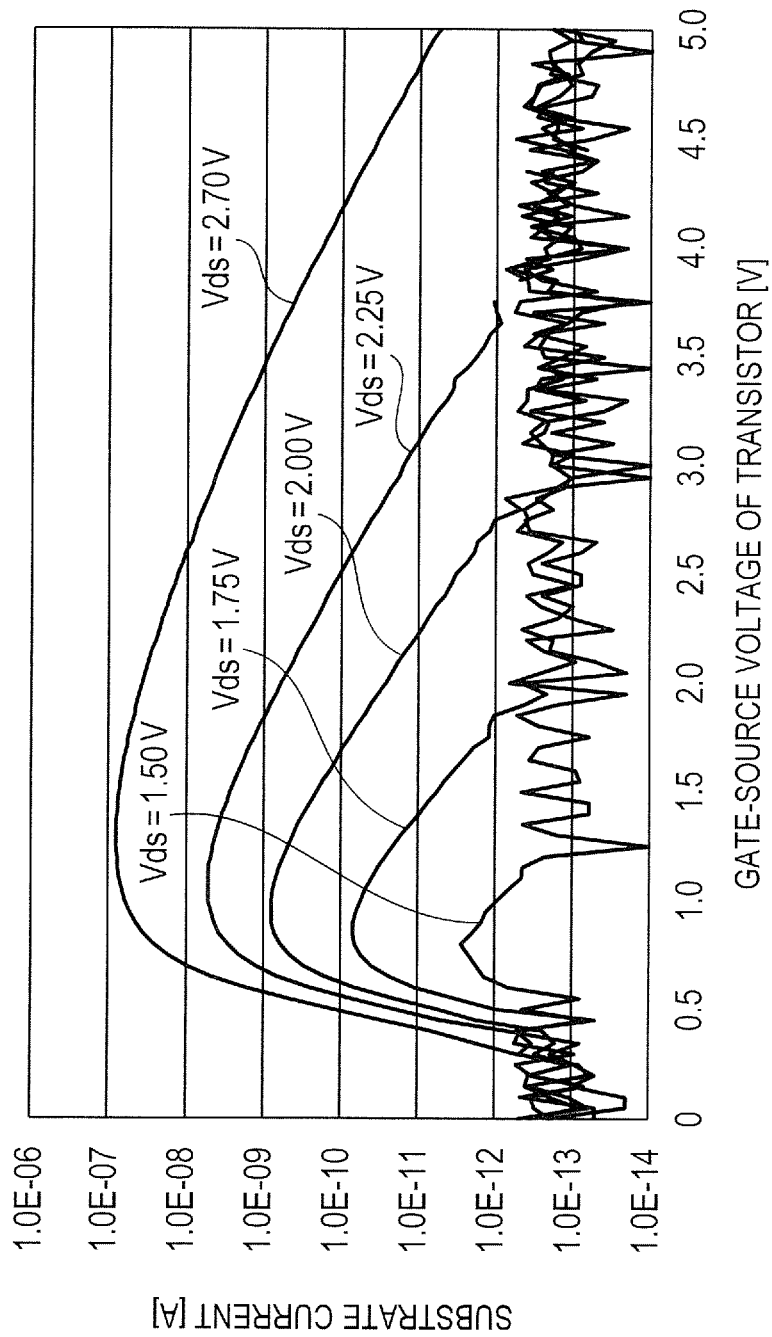
FIG. 4 is a graph illustrating an example of the gate-source voltage dependence of a substrate current in a transistor.

A solid-state imaging device and a method of driving the same according to a first embodiment of the present invention will be described with reference to FIGS. 1 to 4. FIG. 1 is a schematic view illustrating the overall arrangement of the solid-state imaging device according to the present embodiment. FIG. 2 is a circuit diagram illustrating the circuit arrangement of a pixel and a pixel current source circuit of the solid-state imaging device according to the present embodiment. FIG. 3 is a timing chart illustrating the operation timing in a method of driving the solid-state imaging device according to the present embodiment. FIG. 4 is a graph illustrating an example of the gate-source voltage dependence of a substrate current in a transistor.

The structure of the solid-state imaging device according to the present embodiment will be described first with reference to FIGS. 1 and 2.

As illustrated in FIG. 1, the solid-state imaging device according to the present embodiment includes an imaging region 1, a row select circuit 5, a timing generator 6, a pixel current source circuit 7, a column circuit 8, and a horizontal scanning circuit 9. A plurality of pixels 2 are two-dimensionally arranged in the imaging region 1 along the horizontal direction (row direction) and the vertical direction (column direction). Vertical output lines 3 extending in the column direction are respectively arranged for the respective columns of pixels 2 arranged in the imaging region 1. The vertical output lines 3 are signal lines common to the pixels 2 arranged in the column direction. The vertical output lines 3 are connected to the pixel current source circuit 7 and the column circuit 8. The horizontal scanning circuit 9 is connected to the column circuit 8. Pixel driving signal lines 4 extending in the row direction are respectively arranged for the respective rows of the pixels 2 arranged in the imaging region 1. The pixel driving signal lines 4 are signal lines common to the pixels 2 arranged in the row direction. The pixel driving signal lines 4 are connected to the row select circuit 5.

The timing generator 6 is connected to the row select circuit 5, the pixel current source circuit 7, the column circuit 8, and the horizontal scanning circuit 9. With this arrangement, output signals from the pixels 2 can be sequentially output to the column circuit 8 via the vertical output lines 3 on a row basis by outputting predetermined pixel driving signals from the row select circuit 5 to the pixel driving signal lines 4 at a predetermined operation timing controlled by the timing generator 6. In addition, pixel signals amplified and held by the column circuit 8 can be sequentially output to the outside by outputting predetermined driving signals from the horizontal scanning circuit 9 to the column circuit 8 at a predetermined operation timing controlled by the timing generator 6.

As illustrated in FIG. 2, each pixel 2 includes a PD (PhotoDiode) 11, a transfer transistor 12, a reset transistor 13, an amplifier transistor 14, and a select transistor 15. The anode of the PD 11 is connected to a ground voltage line. The cathode of the PD 11 is connected to the source of the transfer transistor 12. The drain of the transfer transistor 12 is connected to the source of the reset transistor 13 and the gate of the amplifier transistor 14. The connection node of the drain of the transfer transistor 12, the source of the reset transistor 13, and the gate of the amplifier transistor 14 forms an FD (Floating Diffusion) 16. Referring to FIG. 2, the FD 16 is represented by a capacitor connected between the ground voltage line and the connection node of the drain of the transfer transistor 12, the source of the reset transistor 13, and the gate of the amplifier transistor 14. The drains of the reset transistor 13 and the amplifier transistor 14 are connected to a power supply voltage line 10. The source of the amplifier transistor 14 is connected to the drain of the select transistor 15. The source of the select transistor 15 is connected to the vertical output line 3.

The PD 11 is a photoelectric conversion unit which generates signal charges in accordance with the amount of incident light. The transfer transistor 12 serves to transfer charges generated and accumulated in the PD 11 to the FD 16. The FD 16 is an accumulation unit which accumulates charges transferred from the PD 11 at the time of signal readout. The reset transistor 13 is used to reset the potential of the FD 16. In this specification, the reset transistor 13 is sometimes called the reset unit. The amplifier transistor 14 serves to amplify and output a signal corresponding to the amount of charges accumulated in the FD 16. The select transistor 15 controls selection of the pixel 2 for readout, i.e., connection between the output of the amplifier transistor 14 and the vertical output line 3. In this case, the amplifier transistor 14 is a depletion type NMOS transistor, and the remaining transistors are enhancement type NMOS transistors.

Each pixel driving signal line 4 includes a transfer gate signal line TX, a reset signal line RES, and a row select signal line SEL (none of which are shown). The transfer gate signal line TX serves to output a transfer gate signal PTX from the row select circuit 5 to the pixels 2, and is connected to the gates of the transfer transistors 12 of the corresponding pixels 2. The reset signal line RES serves to output a reset signal PRES from the row select circuit 5 to the pixel 2s, and is connected to the gates of the reset transistors 13 of the corresponding pixels 2. The row select signal line SEL serves to output a row select signal PSEL from the row select circuit 5 to the pixels 2, and is connected to the gates of the select transistors 15 of the corresponding pixels 2.

As illustrated in FIG. 2, the pixel current source circuit 7 includes a first transistor 17, a second transistor 18, and a third transistor 19. FIG. 2 illustrates only a portion, of the pixel current source circuit 7, which is connected to the vertical output line 3 of one column. The first transistor 17 is a transistor serving as part of a current source which defines a constant current made to flow through the vertical output line 3. The second transistor 18 and the third transistor 19 mainly serve to ensure the operation of the first transistor 17 as a current source by holding the drain-source voltage of the first transistor 17 constant regardless of the voltage of the vertical output line 3. The third transistor 19 also functions as an ON/OFF switch which activates the amplifier transistor 14 only for a necessary period and inactivates it for other periods. The first transistor 17, the second transistor 18, and the third transistor 19 are connected in series between the ground voltage line and the vertical output line 3 in the order named. That is, the source of the first transistor 17 is connected to the ground voltage line. The source of the second transistor 18 is connected to the drain of the first transistor 17. The source of the third transistor 19 is connected to the drain of the second transistor 18. The drain of the third transistor 19 is connected to the vertical output line 3. A voltage setting circuit 20 is connected to the gate of the first transistor 17, the gate of the second transistor 18, and the gate of the third transistor 19 to apply predetermined voltages to these gates. Referring to FIG. 2, a voltage Vds1 indicates the drain-source voltage of the first transistor 17, a voltage Vds2 indicates the drain-source voltage of the second transistor 18, and a voltage Vds3 indicates the drain-source voltage of the third transistor 19.

A method of driving a solid-state imaging device according to the present embodiment will be described next with reference to FIGS. 2 and 3. FIG. 3 is a timing chart illustrating an operation timing when reading out a plurality of pixels 2 belonging to one row of the imaging region 1. Sequentially performing similar readout operations with respect to the respective rows can read out pixel signals from all the pixels 2 in the imaging region 1. Referring to FIG. 3, a signal PSAVE represents an operation timing when using the third transistor 19 as an ON/OFF switch for the amplifier transistor 14. That is, when the signal PSAVE is at low level, the third transistor 19 is controlled to an ON state, whereas when the signal PSAVE is at high level, the third transistor 19 is controlled to an OFF state.

First of all, assume that the row select circuit 5 has output the low-level row select signal PSEL, the high-level reset signal PRES, and the low-level transfer gate signal PTX in a period to time t1. That is, the row is not selected, and the select transistor 15 is set in an OFF state. In addition, the reset transistor 13 is set in an ON state, and the power supply voltage line 10 is connected to the FD 16 via the reset transistor 13. This resets the FD 16 to a predetermined reset voltage in accordance with a power supply voltage. In addition, the transfer transistor 12 is in an OFF state, and the PD 11 is disconnected from the FD 16. This sets the PD 11 in a floating state, and charges generated by photoelectric conversion are accumulated in the PD 11. In addition, the signal PSAVE is at low level, and the third transistor 19 is set in an ON state.

At time t1, the row select circuit 5 changes the row select signal PSEL from low level to high level to select a row. This turns on the select transistor 15 to connect the amplifier transistor 14 to the vertical output line 3 via the select transistor 15.

At time t2, the row select circuit 5 changes the reset signal PRES from high level to low level. This turns off the reset transistor 13 to disconnect the FD 16 from the power supply voltage line 10. As a result, the FD 16, i.e., the gate of the amplifier transistor 14, is set in a floating state.

In the period from time t2 to time t3, the column circuit 8 receives an output signal from the pixel 2 which is output to the vertical output line 3. That is, in this period, the signal PSAVE is at low level, and the pixel current source circuit 7 is in an ON state. In this state, therefore, a bias current is supplied from the pixel current source circuit 7 to the source of the amplifier transistor 14 via the vertical output line 3 and the select transistor 15, thereby forming a source-follower circuit. With this operation, a signal (to be referred to as an "N signal" hereinafter) at a level corresponding to the reset voltage of the FD 16 is amplified by the amplifier transistor 14 and is output to the vertical output line 3 via the select transistor 15. The N signal output to the vertical output line 3 is input to the column circuit 8 and held in it.

At time t3, the row select circuit 5 changes the transfer gate signal PTX from low level to high level. This turns on the transfer transistor 12 to connect the PD 11 to the FD 16 via the transfer transistor 12, thereby transferring charges accumulated in the PD 11 to the FD 16.

At time t4, the row select circuit 5 changes the transfer gate signal PTX from high level to low level. This turns off the transfer transistor 12 to disconnect the PD 11 from the FD 16.

In the period from time t4 to time t5, the column circuit 8 receives an output signal from the pixel 2 which is output to the vertical output line 3. That is, in this period, the signal PSAVE is at low level, and the pixel current source circuit 7 is in an ON state. In this state, therefore, a bias current is supplied from the pixel current source circuit 7 to the source of the amplifier transistor 14 via the vertical output line 3 and the selection transistor 15, thereby forming a source-follower circuit. With this operation, a signal (to be referred to as an "S signal" hereinafter) at a level corresponding to the amount of signal charges transferred from the PD 11 to the FD 16 is amplified by the amplifier transistor 14 and is output to the vertical output line 3 via the select transistor 15. The S signal output to the vertical output line 3 is input to the column circuit 8 and held in it.

At time t5, the signal PSAVE is set at high level, and the third transistor 19 is turned off. This disconnects the amplifier transistor 14 from the first transistor 17 serving as part of a current source. That is, the pixel current source circuit 7 is kept inactive during an unused period of the pixel current source circuit 7, other than a signal readout period. This can suppress heat generation and hot carrier generation caused by the operation of the first transistor 17 serving as part of a current source.

The N signal and the S signal on each column, which are held in the column circuit 8, are output to an external circuit for each column by the horizontal scanning circuit 9 after the N signal level is subtracted from the S signal level.

Subsequently, at time t6, the row select circuit 5 changes the row select signal PSEL from high level to low level to cancel the selection of the row, thereby completing the readout of the corresponding row.

The first transistor 17, the second transistor 18, and the third transistor 19 which are connected to the vertical output line 3 and constitute the pixel current source circuit 7 are arranged near the PD 11 of the pixel 2. Therefore, when high voltages are applied between the sources and drains of these transistors at the time of the above readout operation, hot carriers generated by electric field concentration flow into the PD 11 to become noise components. This may degrade image quality. In addition, light emission originating from the recombination of the hot carriers sometimes causes noise. Referring to FIG. 1, in particular, a hatched region 1A in the imaging region 1 is adjacent to the pixel current source circuit 7. The image quality of the pixels in the hatched region 1A may be degraded by hot carrier generation. If the pixel current source circuit 7 is also arranged along the upper portion of the imaging region 1, image quality degradation caused by hot carriers will influence the pixels 2 on the upper portion side of the imaging region 1.

An example of voltage conditions for the occurrence of image quality degradation by hot carriers will be described below. A state in which hot carriers tend to be generated corresponds to a state in which the vertical output line 3 is at a high potential, i.e., the period from time t1 to time t3 and the period from time t3 to time t5 without irradiation with light illustrated in FIG. 3.

Assume that each transistor is a transistor (5 V transistor) expected to operate at a power supply voltage of 5 V, and the voltage of the power supply voltage line 10 is 4.5 V. In this case, consider the highest voltage output to the vertical output line 3. Note that 4.5 V assumed in this case is a typical example of the lower limit value of operation-guaranteed voltages for a 5 V transistor.

In the period from time t1 to time t3, a voltage of about 4.4 V is applied to the gate of the amplifier transistor 14, assuming that the drain-source voltage of the reset transistor 13 is about 0.1 V. In this case, the voltage of the vertical output line 3, i.e., the drain voltage of the third transistor 19, is 3.1 V, assuming that the gate-source voltage of the amplifier transistor 14 is 1.2 V, and the drain-source voltage of the select transistor 15 is about 0.1 V.

Assume that a voltage of 0.8 V is applied to the gate of the first transistor 17 serving as part of a current source and the drain-source voltage Vds1 is maintained at 0.8 V in order to ensure a constant current characteristic. The drain-source voltage Vds1 of the first transistor 17 can be controlled by the gate voltage of the second transistor 18. If, for example, the gate-source voltage of the second transistor 18 is 1.2 v, a voltage of 2.0 V is applied to the gate of the second transistor 18.

When the third transistor 19 operates as an ON/OFF switch for the amplifier transistor 14, a voltage of 4.5 V, which is equal to the power supply voltage, is applied to the gate of the third transistor 19. In this case, the drain-source voltage Vds3 of the third transistor 19 is about 0.1 V. Therefore, the drain-source voltage Vds2 of the second transistor 18 is 2.2 V.

FIG. 4 is a graph indicating an example of the relationship between a substrate current and the gate-source voltage of a 5 V NMOS transistor which corresponds to the second transistor 18 and the third transistor 19. E-n in FIG. 4 indicates the n-th power of 10. That is, 1.0E-6 indicates a value obtained by multiplying the −6th power of 10 by 1.0. Referring to FIG. 4, the abscissa represents the gate-source voltage of a transistor, and the ordinate represents a current (substrate current) flowing in a silicon substrate. FIG. 4 shows a plurality of characteristics with different drain-source voltages Vds of transistors.

As shown in FIG. 4, the substrate current increases as the drain-source voltage Vds of the transistor increases. In the above case, when a voltage of 2.2 V is applied between the drain and source of the second transistor 18, it is expected that the peak value of the substrate current will fall between $1.0 \times 10^{-9}$ [A] and $1.0 \times 10^{-8}$ [A], as shown in FIG. 4. Past findings indicate that image quality degradation caused by hot carriers becomes noticeable when a substrate current larger than $1.0 \times 10^{-9}$ [A] flows. That is, under the above condition, the influence of hot carriers may further degrade the image quality. In order to suppress the influence of hot carriers, the value of the substrate current is preferably smaller than $1.0 \times 10^{-10}$ [A] from FIG. 4 in consideration of also variations in substrate current value and the like. That is, in the case of the above 5 V NMOS transistor, setting the drain-source voltage of the transistor connected to the vertical output line 3 to 1.75 V or less will have a beneficial effect on the suppression of the influence of hot carriers.

In the driving method according to the present embodiment, the gate voltage of the third transistor 19 is controlled to a predetermined voltage lower than the power supply voltage, as when the transistor operates on a constant current instead of operating as a simple switch driven by the power supply voltage. More specifically, the gate voltage of the second transistor 18 is controlled to be higher than the gate voltage of the first transistor 17, and the gate voltage of the third transistor 19 is controlled to be higher than the gate voltage of the second transistor 18 and lower than the power supply voltage. This suppresses the drain-source voltages of the transistors 17, 18, and 19 to 1.75 V or less.

For example, the gate voltage of the third transistor 19 is controlled to set the drain-source voltage of the second transistor 18 to about 1.0 V so as to ensure a constant current characteristic. If the gate-source voltage of the third transistor 19 is 1.2 V, a voltage of 3.0 V is applied to the gate of the third transistor 19. In this case, the drain-source voltage of the third transistor 19 becomes 1.3 V, and hence it is possible to suppress the gate-source voltages of the transistors 17, 18, and 19 connected to the vertical output line 3 to 1.75 V or less. This makes it possible to suppress image quality degradation caused by hot carriers.

In the above case, when the voltage of the power supply voltage line 10 exceeds 4.05 V, the drain-source voltage of the second transistor 18 can exceed 1.75 V. If, for example, the voltage of the power supply voltage line 10 is 3.3 V, the voltages of the transistors 17, 18, and 19 connected to the vertical output line 3 have the following relationship, and there is no influence of image quality degradation caused by hot carriers.

In the period between time t1 and time t3, a voltage of about 3.2 V is applied to the gate of the amplifier transistor 14, assuming that the drain-source voltage of the reset transistor 13 is about 0.1 V. In this case, assuming that the gate-source voltage of the amplifier transistor 14 is 1.2 V and the drain-source voltage of the select transistor 15 is about 0.1 V, the voltage of the vertical output line 3, i.e., the drain voltage of the third transistor 19, is 1.9 V.

Assume that a voltage of 0.8 V is applied to the gate of the first transistor 17 serving as part of the current source and drain-source voltage Vds1 is maintained at 0.8 V to ensure a constant current characteristic. The drain-source voltage Vds1 of the first transistor 17 can be controlled by the gate voltage of the second transistor 18. For example, when the drain-source voltage of the second transistor 18 is 1.2 V, a voltage of 2.0 V is applied to the gate of the second transistor 18.

When the third transistor 19 operates as an ON/OFF switch for the amplifier transistor 14, a voltage of 3.3 V, which is equal to the power supply voltage, is applied to the gate of the third transistor 19. In this case, the drain-source voltage Vds3 of the third transistor 19 is about 0.1 V. Therefore, the drain-source voltage Vds2 of the second transistor 18 is about 1.0 V, and hence the substrate current becomes $1.0 \times 10^{-10}$ [A] or less, thereby eliminating any adverse effect on image quality.

As described above, when the voltage of the power supply voltage line 10, which is a reset voltage, is 4.05 V or more, since hot carriers may cause image quality degradation, the gate voltage of the third transistor 19 is preferably set to a voltage lower than the voltage of the power supply voltage line 10. This can control an increase in the source voltage of the third transistor 19 and decrease the drain-source voltage of each transistor connected to the vertical output line 3 to 1.75 V or less, thereby suppressing image quality degradation caused by the influence of hot carriers.

Second Embodiment

A solid-state imaging device and a method of driving the same according to a second embodiment of the present invention will be described with reference to FIG. 5. The same reference numerals denote the same constituent elements as those of the solid-state imaging device according to the first embodiment illustrated in FIGS. 1 to 4, and hence a description of them will be omitted or simplified.

Figure 5:
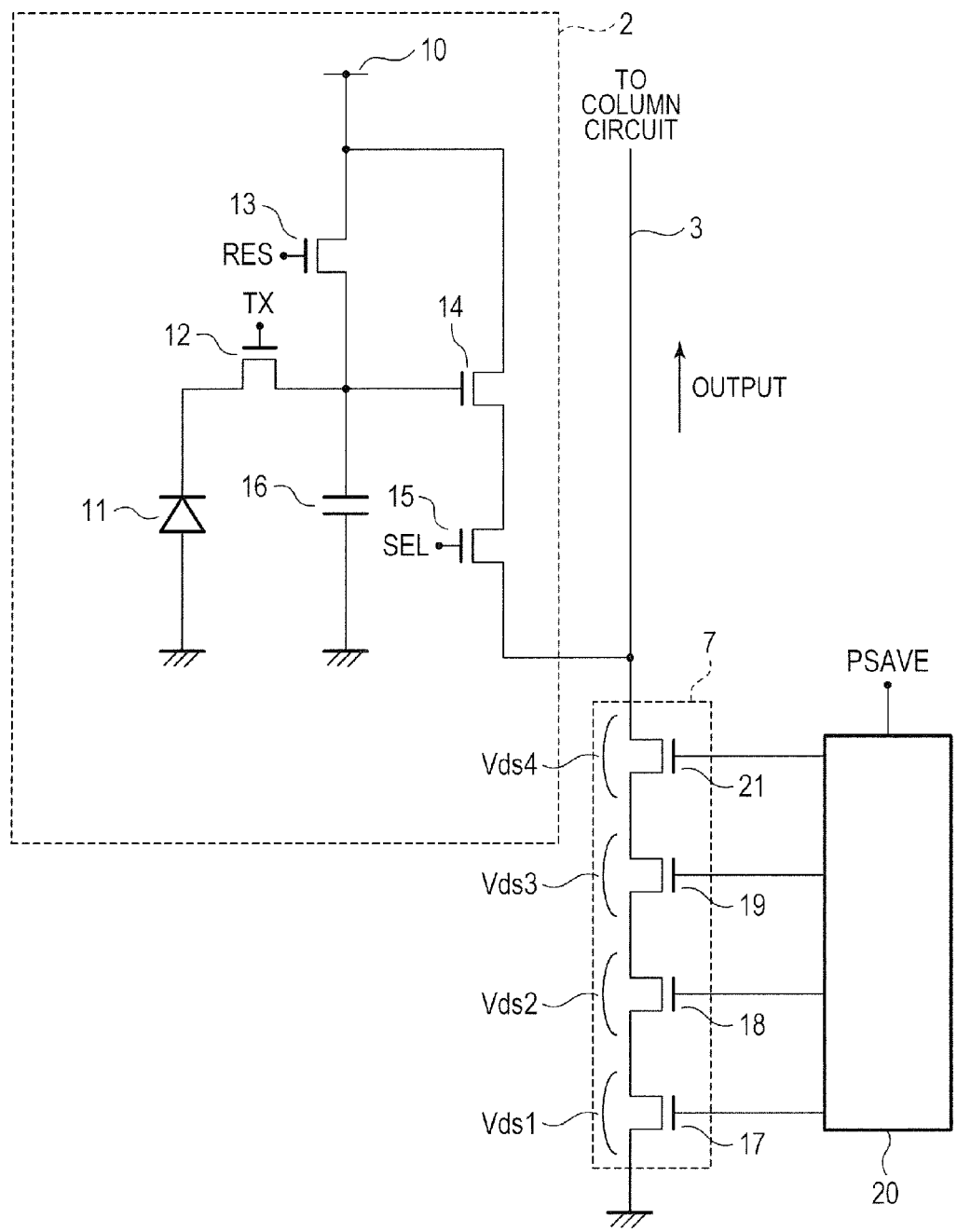
FIG. 5 is a circuit diagram illustrating the circuit arrangement of a pixel and a pixel current source circuit of a solid-state imaging device according to a second embodiment of the present invention.

FIG. 5 is a circuit diagram illustrating the circuit arrangement of a pixel of the solid-state imaging device and a constant current circuit according to the present embodiment.

As illustrated in FIG. 5, the solid-state imaging device according to the present embodiment is the same as the solid-state imaging device according to the first embodiment illustrated in FIGS. 1 and 2 except for the circuit arrangement of a pixel current source circuit 7. That is, the pixel current source circuit 7 of the solid-state imaging device according to the present embodiment further includes a fourth transistor 21 between a vertical output line 3 and a third transistor 19. The source and drain of the fourth transistor 21 are respectively connected to the drain of the third transistor 19 and the vertical output line 3.

Referring to FIG. 5, a voltage Vds1 indicates the drain-source voltage of a first transistor 17 serving as part of a current source. A voltage Vds2 indicates the drain-source voltage of a second transistor 18. A voltage Vds3 indicates the drain-source voltage of the third transistor 19. A voltage Vds4 indicates the drain-source voltage of the fourth transistor 21. A voltage setting circuit 20 applies a predetermined voltage to the gate of each transistor of the pixel current source circuit 7.

As in the first embodiment, in the solid-state imaging device according to the present embodiment, the gate voltage of the fourth transistor 21 is set to a voltage lower than the voltage of a power supply voltage line 10, which is a reset voltage, and the source voltage of the fourth transistor 21 is controlled. This makes it possible to suppress the source-drain voltage of each of the first, second, third, and fourth transistors 17, 18, 19, and 21, which constituted the pixel current source circuit 7, to 1.75 V or less. As a result, it is possible to suppress image quality degradation caused by hot carrier light emission.

Note that in the present embodiment, the number of transistors connected to the vertical output line 3 is increased by one to be four. Ever, when the number of transistors is increased by one, the same effects as those described above can be obtained.

Third Embodiment

A method of driving a solid-state imaging device according to a third embodiment of the present invention will be described with reference to FIGS. 1 and 2. The same reference numerals denote the same constituent elements as those of the solid-state imaging devices according to the first and second embodiments illustrated in FIGS. 1 to 5, and hence a description of them will be omitted or simplified.

The present embodiment will exemplify another driving method for the solid-state imaging device according to the first embodiment illustrated in FIGS. 1 and 2.

The method of driving the solid-state imaging device according to the present embodiment is configured to switch the gate voltage of a third transistor 19 in accordance with an imaging sensitivity (ISO sensitivity) setting in the solid-state imaging device.

That is, when a set value of ISO sensitivity in the solid-state imaging device is low, the gain is low and hot carrier light emission has a small influence on image quality degradation. For this reason, the gate voltage of the third transistor 19 is set to the same voltage as that of a power supply voltage line 10, which is a reset voltage, and the third transistor 19 is made to perform a switching operation. This can enlarge the dynamic range of the output of an amplifier transistor 14 which is read out to a vertical output line 3.

In contrast, when a set value of ISO sensitivity in the solid-state imaging device is high, the gain is high and hot carrier light emission has a noticeable influence on image quality degradation. For this reason, the gate voltage of the third transistor 19 is set to a voltage lower than that of the power supply voltage line 10, which is a reset voltage, and the source voltage of the third transistor 19 is controlled. This can suppress the drain-source voltage of each of a first transistor 17, a second transistor 18, and the third transistor 19, which constitute a pixel current source circuit 7, to 1.75 V or less. As a result, it is possible to suppress image quality degradation caused by hot carrier light emission.

As described above, according to the present embodiment, since the gate voltage of the third transistor is controlled in accordance with an ISO sensitivity set value, it is possible to enlarge the dynamic range at the time of a low ISO sensitivity setting while suppressing image quality degradation caused by hot carrier light emission.

Fourth Embodiment

An imaging system according to a fourth embodiment of the present invention will be described with reference to FIG. 6. FIG. 6 is a schematic view illustrating an example of the arrangement of the imaging system according to the present embodiment.

The imaging device described in each of the above embodiments can be applied to various types of imaging systems. For example, such imaging systems include a digital still camera, a digital camcorder, and a monitoring camera. FIG. 6 illustrates an example of the arrangement of an imaging system when one of the imaging devices described in the above embodiments is applied to a digital still camera.

An imaging system 100 according to the present embodiment exemplarily illustrated in FIG. 6 includes a solid-state imaging device 101, a lens 103, an aperture 104, a barrier 102, and a signal output processing unit 105. The lens 103 serves to form an optical image of an object on the solid-state imaging device 101. The aperture 104 serves to variably change the amount of light passing through the lens 103. The lens 103 and the aperture 104 constitute an optical system which condenses light on the solid-state imaging device 101. The barrier 102 serves to protect the lens 103. The solid-state imaging device 101 is equivalent to one of the solid-state imaging devices according to the above embodiments.

The imaging system 100 exemplarily illustrated in FIG. 6 further includes the signal output processing unit 105. The signal output processing unit 105 serves to process an output signal output from the solid-state imaging device 101. The signal output processing unit 105 generates an image based on a signal output from the solid-state imaging device 101. More specifically, in addition, the signal output processing unit 105 outputs image data by performing various types of correction and compression as needed. The signal output processing unit 105 may have a function of performing focus detection by using a signal output from the solid-state imaging device 101.

The imaging system 100 exemplarily illustrated in FIG. 6 further includes a buffer memory unit 108, a storage medium control interface unit (storage medium control I/F unit) 109, an external interface unit (external I/F unit) 110, and a storage medium 111. The buffer memory unit 108 serves to temporarily store image data output from the signal output processing unit 105. The external I/F unit 110 serves to communicate with an external computer or the like. The storage medium 111 is a semiconductor memory for storing or reading out captured data. The storage medium control I/F unit 109 serves to store or read out data in or from the storage medium 111. Note that the storage medium 111 may be incorporated in the imaging system or be detachable.

The imaging system 100 exemplarily illustrated in FIG. 6 further includes a general control/operation unit 107, and a timing generating unit 106. The general control/operation unit 107 serves to execute general control of the digital still camera and various types of operations. The timing generating unit 106 serves to output various types of timing signals to the solid-state imaging device 101 and the signal output processing unit 105. In this case, timing signals and the like may be externally input. The imaging system 100 may include at least the solid-state imaging device 101 and the signal output processing unit 105 which processes an output signal output from the solid-state imaging device 101.

Forming, in this manner, an imaging system to which the solid-state imaging devices according to the first to third embodiments are applied can implement an imaging system which can obtain high-quality images by suppressing image quality degradation caused by hot carrier light emission.

[Modification]

The present invention is not limited to the above embodiments and can be variously modified.

For example, FIGS. 2 and 5 each illustrate an example of the circuit arrangement of each pixel 2, and the circuit arrangement of each pixel 2 is not limited to any of those illustrated in FIGS. 2 and 5. The pixel 2 may include at least a photoelectric conversion element, an accumulation unit to which charges generated by the photoelectric conversion element are transferred, a reset unit which resets the accumulation unit, and an amplifier transistor which amplifies and outputs a signal corresponding to the amount of charges accumulated in the accumulation unit.

In addition, the driving voltages for the pixel current source circuit 7 described in each embodiment described above are set based on the data illustrated in FIG. 4 and the like, which are obtained in typical device structures by the present inventors. However, the above numerical values may not always indicate critical values. One purpose of the present invention is to set gate voltages for the respective transistors constituting the pixel current source circuit 7 to values lower than the power supply voltage so as to set the drain-source voltages of the transistors to voltages that cause no hot carrier light emission. Driving voltages for the pixel current source circuit 7 are not limited to those described in the above embodiments as long as they serve the purpose.

In addition, although the third embodiment has exemplified the driving method of controlling the gate voltage of the third transistor in accordance with an ISO sensitivity set value in the solid-state imaging device according to the first embodiment, the same driving method may be executed in the solid-state imaging device according to the second embodiment.

The imaging system described in the fourth embodiment is an example of an imaging system to which the solid-state imaging device according to the present invention can be applied. However, an imaging system to which the solid-state imaging device according to the present invention can be applied is not limited to the arrangement illustrated in FIG. 6.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053097, filed Mar. 17, 2015, which is hereby incorporated by reference herein in its entirety.

What is claimed is:

1. A solid-state imaging device comprising:
    a pixel including
        a photoelectric conversion element,
        an accumulation unit to which charges generated by the photoelectric conversion element are transferred,
        a reset unit configured to reset the accumulation unit at a power supply voltage of equal to or more than 4.05 V, and
        an amplifier transistor configured to amplify and output a signal corresponding to amount of charges accumulated in the accumulation unit;
    a vertical output line which is connected to the pixel and to which the signal amplified by the amplifier transistor is output;
    a current source circuit including a third transistor connected to the vertical output line, a second transistor connected in series with the third transistor, and a first transistor connected in series with the second transistor and configured to make a predetermined constant current flow through the vertical output line; and
    a voltage setting circuit configured to set a gate voltage of the first transistor to a first voltage, a gate voltage of the second transistor to a second voltage higher than the first voltage, and a gate voltage of the third transistor to a third voltage higher than the second voltage and lower than the power supply voltage so as to set a drain-source voltage of each of the first transistor, the second transistor, and the third transistor to equal to or less than 1.75 V.

2. The solid-state imaging device according to claim 1, wherein
    the current source circuit further includes not less than one other transistor connected in series with the first transistor, the second transistor, and the third transistor.

3. The solid-state imaging device according to claim 1, wherein
    the voltage setting circuit is configured to set the first voltage and the second voltage so as to make the first transistor to make a predetermined constant current flow regardless of a voltage of the vertical output line.

4. The solid-state imaging device according to claim 3, wherein
    the current source circuit further includes not less than one other transistor connected in series with the first transistor, the second transistor, and the third transistor.

5. The solid-state imaging device according to claim 1, wherein
    the voltage setting circuit is configured to:
        set the gate voltage of the third transistor to the third voltage when ISO sensitivity is a first set value, and
        set the gate voltage of the third transistor to a fifth voltage higher than the third voltage when the ISO sensitivity is a second set value lower than the first set value.

6. The solid-state imaging device according to claim 5, wherein
the current source circuit further includes not less than one other transistor connected in series with the first transistor, the second transistor, and the third transistor.

7. The solid-state imaging device according to claim 5, wherein
the voltage setting circuit is configured to set the first voltage and the second voltage so as to make the first transistor to make a predetermined constant current flow regardless of a voltage of the vertical output line.

8. The solid-state imaging device according to claim 7, wherein
the current source circuit further includes not less than one other transistor connected in series with the first transistor, the second transistor, and the third transistor.

9. The solid-state imaging device according to claim 1, wherein
the voltage setting circuit is configured to set the gate voltage of the third transistor to a fourth voltage which turns off the third transistor during an unused period of the current source circuit.

10. The solid-state imaging device according to claim 9, wherein
the current source circuit further includes not less than one other transistor connected in series with the first transistor, the second transistor, and the third transistor.

11. The solid-state imaging device according to claim 9, wherein
the voltage setting circuit is configured to set the first voltage and the second voltage so as to make the first transistor to make a predetermined constant current flow regardless of a voltage of the vertical output line.

12. The solid-state imaging device according to claim 11, wherein
the current source circuit further includes not less than one other transistor connected in series with the first transistor, the second transistor, and the third transistor.

13. The solid-state imaging device according to claim 9, wherein
the voltage setting circuit is configured to:
set the gate voltage of the third transistor to the third voltage when ISO sensitivity is a first set value, and
set the gate voltage of the third transistor to a fifth voltage higher than the third voltage when the ISO sensitivity is a second set value lower than the first set value.

14. The solid-state imaging device according to claim 13, wherein
the current source circuit further includes not less than one other transistor connected in series with the first transistor, the second transistor, and the third transistor.

15. The solid-state imaging device according to claim 13, wherein
the voltage setting circuit is configured to set the first voltage and the second voltage so as to make the first transistor to make a predetermined constant current flow regardless of a voltage of the vertical output line.

16. The solid-state imaging device according to claim 15, wherein
the current source circuit further includes not less than one other transistor connected in series with the first transistor, the second transistor, and the third transistor.

17. A solid-state imaging device comprising:
a pixel including
a photoelectric conversion element,
an accumulation unit to which charges generated by the photoelectric conversion element are transferred,
a reset unit configured to reset the accumulation unit at a power supply voltage, and
an amplifier transistor configured to amplify and output a signal corresponding to amount of charges accumulated in the accumulation unit;
a vertical output line which is connected to the pixel and to which the signal amplified by the amplifier transistor is output;
a current source circuit including a third transistor connected to the vertical output line, a second transistor connected in series with the third transistor, and a first transistor connected in series with the second transistor and configured to make a predetermined constant current flow through the vertical output line; and
a voltage setting circuit configured to set a gate voltage of the first transistor to a first voltage, a gate voltage of the second transistor to a second voltage higher than the first voltage, and a gate voltage of the third transistor to a third voltage higher than the second voltage and lower than the power supply voltage so as to prevent a drain-source voltage of each of the first transistor, the second transistor, and the third transistor from generating hot carriers.

18. A method of driving a solid-state imaging device including a pixel including a photoelectric conversion element, an accumulation unit to which charges generated by the photoelectric conversion element are transferred, a reset unit configured to reset the accumulation unit at a power supply voltage of equal to or more than 4.05 V, and an amplifier transistor configured to amplify and output a signal corresponding to amount of charges accumulated in the accumulation unit, a vertical output line to which the signal amplified by the amplifier transistor is output, and a current source circuit connected to the vertical output line, wherein the current source circuit includes a third transistor connected to the vertical output line, a second transistor connected in series with the third transistor, and a first transistor connected in series with the second transistor, the method comprising:
setting a gate voltage of the first transistor to a first voltage, a gate voltage of the second transistor to a second voltage higher than the first voltage, and a gate voltage of the third transistor to a third voltage higher than the second voltage and lower than the power supply voltage so as to set a drain-source voltage of each of the first transistor, the second transistor, and the third transistor to equal to or less than 1.75 V when reading out the signal from the pixel.

19. An imaging system comprising:
a solid-state imaging device; and
a signal processing unit configured to generate an image by using a signal output from the solid-state imaging device, wherein
the solid-state imaging device includes
a pixel including
a photoelectric conversion element,
an accumulation unit to which charges generated by the photoelectric conversion element are transferred,
a reset unit configured to reset the accumulation unit at a power supply voltage of equal to or more than 4.05 V, and
an amplifier transistor configured to amplify and output a signal corresponding to amount of charges accumulated in the accumulation unit, a vertical output line which is connected to the pixel and to which the signal amplified by the amplifier transistor is output, a current source circuit including a third transistor connected to the vertical output line, a second transistor connected in series with the third transistor, and a first transistor connected in series with the second transistor and configured to make a predetermined constant current flow through the vertical output line, and a voltage setting circuit configured to set a gate voltage of the first transistor to a first voltage, a gate voltage of the second transistor to a second voltage higher than the first voltage, and a gate voltage of the third transistor to a third voltage higher than the second voltage and lower than the power supply voltage so as to set a drain-source voltage of each of the first transistor, the second transistor, and the third transistor to equal to or less than 1.75 V.

20. An imaging system comprising:

a solid-state imaging device; and a signal processing unit configured to generate an image by using a signal output from the solid-state imaging device, wherein the solid-state imaging device includes a pixel including a photoelectric conversion element, an accumulation unit to which charges generated by the photoelectric conversion element are transferred, a reset unit configured to reset the accumulation unit at a power supply voltage, and an amplifier transistor configured to amplify and output a signal corresponding to amount of charges accumulated in the accumulation unit;

a vertical output line which is connected to the pixel and to which the signal amplified by the amplifier transistor is output;

a current source circuit including a third transistor connected to the vertical output line, a second transistor connected in series with the third transistor, and a first transistor connected in series with the second transistor and configured to make a predetermined constant current flow through the vertical output line; and a voltage setting circuit configured to set a gate voltage of the first transistor to a first voltage, a gate voltage of the second transistor to a second voltage higher than the first voltage, and a gate voltage of the third transistor to a third voltage higher than the second voltage and lower than the power supply voltage so as to prevent a drain-source voltage of each of the first transistor, the second transistor, and the third transistor from generating hot carriers.

* * * * *